US012755412B2

(12) United States Patent
Mori et al.

(10) Patent No.: US 12,755,412 B2
(45) Date of Patent: Oct. 6, 2026

(54) DIMENSION ESTIMATION DEVICE, DIMENSION ESTIMATION METHOD AND DIMENSION ESTIMATION PROGRAM

(71) Applicant: NTT, INC., Tokyo (JP)

(72) Inventors: Kohei Mori, Tokyo (JP); Yuki Yokohata, Tokyo (JP); Aki Hayashi, Tokyo (JP); Takahiro Hata, Tokyo (JP); Kazuaki Obana, Tokyo (JP)

(73) Assignee: NTT, INC., Tokyo (JP)

( * ) Notice: Subject to any disclaimer, the term of this patent is extended or adjusted under 35 U.S.C. 154(b) by 371 days.

(21) Appl. No.: 18/292,191

(22) PCT Filed: Jul. 29, 2021

(86) PCT No.: PCT/JP2021/028218
§ 371 (c)(1),
(2) Date: Jan. 25, 2024

(87) PCT Pub. No.: WO2023/007684
PCT Pub. Date: Feb. 2, 2023

(65) Prior Publication Data
US 2024/0281992 A1 Aug. 22, 2024

(51) Int. Cl.
*G06T 7/60* (2017.01)
*G01B 11/02* (2006.01)
*G06V 20/58* (2022.01)

(52) U.S. Cl.
CPC ................ *G06T 7/60* (2013.01); *G01B 11/02* (2013.01); *G06V 20/58* (2022.01)

(58) Field of Classification Search
None
See application file for complete search history.

(56) References Cited

U.S. PATENT DOCUMENTS

2024/0013423 A1* 1/2024 Zaheer ................. G06V 10/454

FOREIGN PATENT DOCUMENTS

| | | | | |
|---|---|---|---|---|
| CN | 110148169 A | * | 8/2019 | G06T 7/60 |
| CN | 110307791 A | * | 10/2019 | G01B 11/043 |
| EP | 1806595 B1 | * | 4/2009 | G06V 20/58 |

OTHER PUBLICATIONS

S. Li, X. Jiang, H. Qian and Y. Xu, "Vehicle 3-dimension measurement by monocular camera based on license plate," 2016 IEEE International Conference on Robotics and Biomimetics (ROBIO), Qingdao, China, 2016, pp. 800-806. (Year: 2016).*

(Continued)

*Primary Examiner* — David Ometz

(57) ABSTRACT

In a dimension estimation device, an image acquired in a moving body is acquired, and a vanishing point and a predetermined decision line in the image are calculated. An object in the image is detected and a detection rectangle is detected for the object, the detection rectangle being a rectangle including a first surface that is a surface close to a photographing position, the first surface being in proximity to the decision line, and a second surface that is a surface far from the photographing position. A dimension of the object is estimated on the basis of a ratio between a height of the first surface and a height of the second surface obtainable from a relationship between the detection rectangle and the vanishing point.

8 Claims, 25 Drawing Sheets

(56) References Cited

OTHER PUBLICATIONS

A. H. S. Lai, G. S. K. Fung and N. H. C. Yung, "Vehicle type classification from visual-based dimension estimation," ITSC 2001. 2001 IEEE Intelligent Transportation Systems. Proceedings (Cat. No. 01TH8585), Oakland, CA, USA, 2001, pp. 201-206. (Year: 2001).*

Fujitsu (2021) "Fujitsu Public Sector Solution car name recognition system powered by Zinrai" [online] website: https://www.fujitsu.com/jp/products/network/managed-services-network/transport/name-recognition/.

* cited by examiner

LARGE TRUCK

LIGHT TRUCK

DOTTED LINE: IDEAL SOLID LINE: ACTUAL

DIMENSION ESTIMATION DEVICE, DIMENSION ESTIMATION METHOD AND DIMENSION ESTIMATION PROGRAM

CROSS-REFERENCE TO RELATED APPLICATIONS

This application is a U.S. 371 Application of International Patent Application No. PCT/JP2021/028218, filed on 29 Jul. 2021, the disclosure of which is hereby incorporated herein by reference in its entirety.

TECHNICAL FIELD

The technology of the present disclosure relates to a dimension estimation device, a dimension estimation method, and a dimension estimation program.

BACKGROUND ART

There is a technology of detecting another object appearing in a video of an in-vehicle camera such as a drive recorder. For example, an object detection system represented by YOLO is known.

In the field of automatic driving, for example, it is necessary to take measures such as measuring the timing of a lane change on the basis of a dimension of another vehicle around an observation vehicle. As a method of obtaining the dimension, there is a method of specifying the vehicle name of the vehicle shown in the video and referring to the catalog specification (see Non Patent Literature 1).

FIG. 1 is a diagram schematically illustrating a case where another vehicle is observed from an observation vehicle. As illustrated in FIG. 1, it is assumed that another vehicle (A2) is observed from an observation vehicle (A1) to estimate the dimension of the entire length of the other vehicle.

CITATION LIST

Non Patent Literature

Non Patent Literature 1: "Shamei ninshiki system powered by Zinrai (Vehicle name recognition system powered by Zinrai)", URL: "https://www.fujitsu.com/jp/products/network/managed-services-network/transport/name-recognition/"

SUMMARY OF INVENTION

Technical Problem

However, since vehicles designed with unique dimensions frequently appear for each new vehicle name, it is necessary to update the learning content of a representative object detection system each time such vehicle appears, and the running cost increases. In addition, in the object detection system, specification at a vehicle type level is common, and a dedicated system such as Non Patent Literature 1 described above is not common. The vehicle type referred to herein refers to a rough classification such as a passenger car, a truck, and a bus. For example, there are various types of the truck such as a truck whose entire length is specified as 3.4 m or less like a light truck and a large truck whose entire length is specified as 12 m or less. Therefore, enabling dimensions to be obtained in the classification contributes to improvement of versatility.

The disclosed technology has been made in view of the above points, and an object thereof is to provide a dimension estimation device, a dimension estimation method, and a dimension estimation program capable of accurately estimating a dimension of another object on a road.

Solution to Problem

A first aspect of the present disclosure is a dimension estimation device including: an acquisition unit that acquires an image acquired in a moving body; an image information calculation unit that calculates a vanishing point and a predetermined decision line in the image; a detection unit that detects an object in the image and detects a detection rectangle that is a rectangle including a first surface that is a surface close to a photographing position, the first surface being in proximity to the decision line for the object; and a dimension estimation unit that estimates a dimension of the object on the basis of a ratio between a height of the first surface and a height of a second surface that is a surface far from the photographing position, obtainable from a relationship between the detection rectangle and the vanishing point.

A second aspect of the present disclosure is a dimension estimation method including causing a computer to execute processing of: acquiring an image acquired in a moving body; calculating a vanishing point and a predetermined decision line in the image; detecting an object in the image and detecting a detection rectangle that is a rectangle including a first surface that is a surface close to a photographing position, the first surface being in proximity to the decision line for the object; and estimating a dimension of the object on the basis of a ratio between a height of the first surface and a height of a second surface that is a surface far from the photographing position, obtainable from a relationship between the detection rectangle and the vanishing point.

A third aspect of the present disclosure is a dimension estimation program that causes a computer to execute processing of: acquiring an image acquired in a moving body; calculating a vanishing point and a predetermined decision line in the image; detecting an object in the image and detecting a detection rectangle that is a rectangle including a first surface that is a surface close to a photographing position, the first surface being in proximity to the decision line for the object; and estimating a dimension of the object on the basis of a ratio between a height of the first surface and a height of a second surface that is a surface far from the photographing position, obtainable from a relationship between the detection rectangle and the vanishing point.

Advantageous Effects of Invention

According to the disclosed technology, it is possible to accurately estimate a dimension of another object on a road.

DESCRIPTION OF EMBODIMENTS

Figure 1:
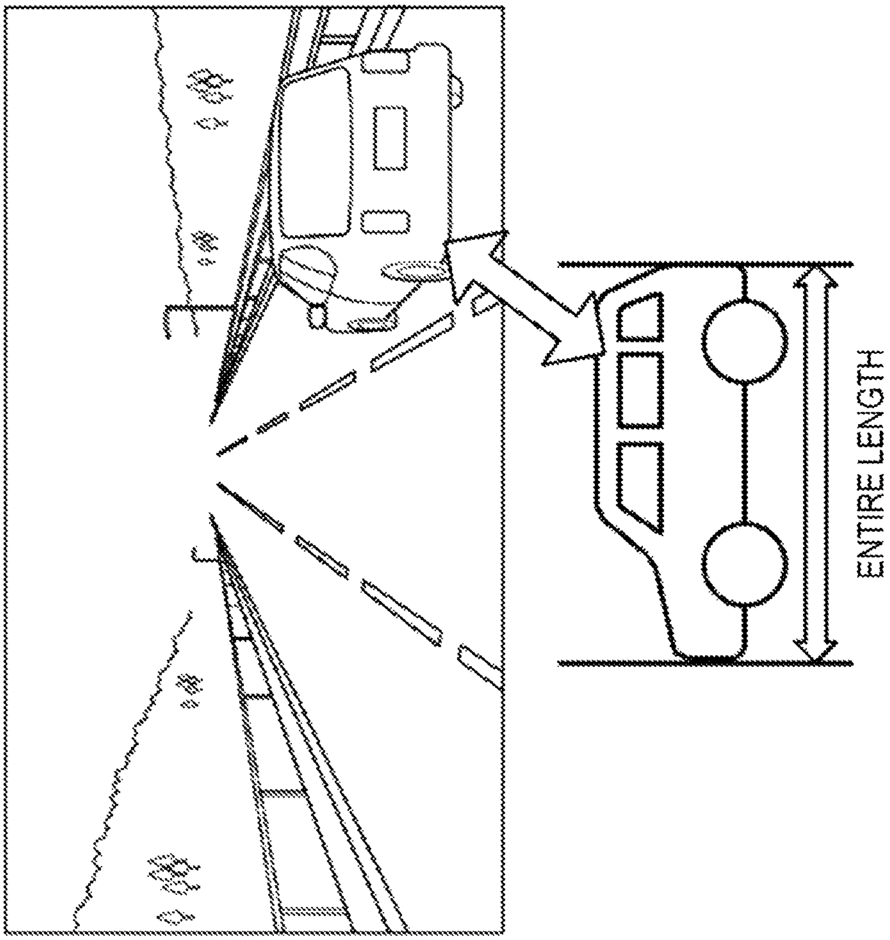
FIG. 1 is a diagram schematically illustrating a case where another vehicle is observed from an observation vehicle.
Figure 1:
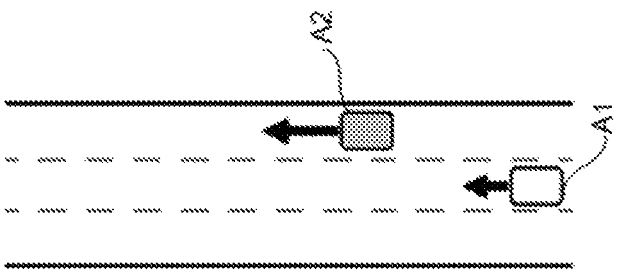

Hereinafter, examples of an embodiment of the disclosed technique will be described with reference to the drawings. Note that, in the drawings, the same or equivalent components and portions are denoted by the same reference numerals. Further, dimensional ratios in the drawings are exaggerated for convenience of description and thus may be different from actual ratios.

First, an overview of the present disclosure will be described. Hereinafter, in the example described in the present embodiment, a case of estimating the dimension of the entire length of another vehicle captured from an observation vehicle that is a moving body will be described. In the image, a case is also assumed where the entire length is not reflected, such as a case where the form of another vehicle is rounded. However, a method of the present embodiment can be similarly applied also to such a case. The estimation result obtained by the method of the present embodiment can be evaluated as, for example, a distribution of dimensions of other vehicles existing on a road on which the observation vehicle has traveled. In the evaluation, when it is decided that a truck, a bus, or the like having a long entire length frequently passes through, it is assumed that the estimation result is to be used as a reference for an expansion plan of a road or an intersection. For example, in a case of an intersection where a large truck of about 12 m frequently turns right/left, the estimation result can be utilized for considering an increase in the number of lanes and a change in the signal cycle.

Figure 2:
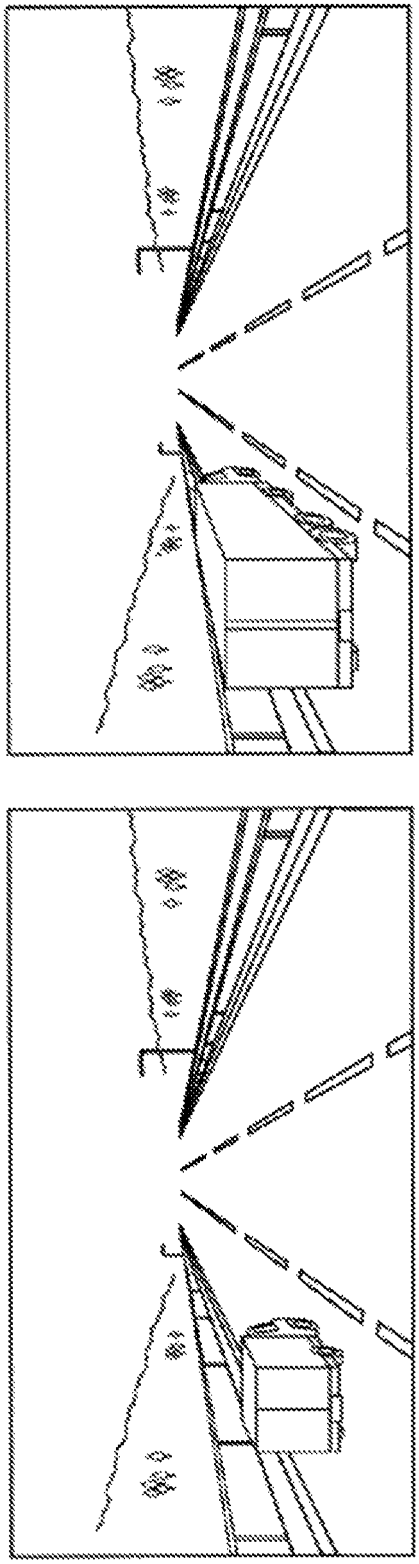
FIG. 2 is an example of a video obtained by observing a light truck and a large truck.

In addition, crowdedness and traffic congestion (traffic congestion for each lane) in units of lanes can be detected from the number of vehicles that overtake passenger cars/trucks/buses per unit time. FIG. 2 is an example of a video obtained by observing a light truck and a large truck. The time required and the distance required are different between the case of overtaking a light truck of about 3 or 4 m and the case of overtaking a large truck of about 12 m. Therefore, it is necessary to estimate “what meters class of vehicle have been overtaken” from the video.

In the estimation result obtained by the method of the present embodiment, for example, the density in the road or the presence or absence of a blank area can be recognized by recognizing a dimension of a vehicle parked on the road that the observation vehicle is about to overtake while traveling or a dimension of a surrounding vehicle that is traveling. Such recognition can be used to assist the automatic driving for deciding whether the observation vehicle may perform the operation in the automatic driving operation such as on-road parking or lane change.

An existing technology utilized in the present embodiment will be described. In the present embodiment, the principle of the camera as described in Reference Document 1 is utilized.

[Reference Document 1] “Enkinkan (Perspective sensation)”, URL: “http://www.persfreaks.jp/main/intro/pers/”

When a monocular camera such as a general in-vehicle camera is used, a feature such as another vehicle or a building is drawn so as to converge with respect to a vanishing point. When an image that is not affected by lens distortion is used, such as when a non-wide-angle lens is used or when a region with less distortion of a wide-angle lens is cut out, the size of an object appearing in the image can be approximated as in a perspective view, and changes according to a law with respect to a distance from a reference point. The size of the object shown in the image is expressed by “side length”, and the area changes by the square of the side length in the case of a square.

Figure 3:
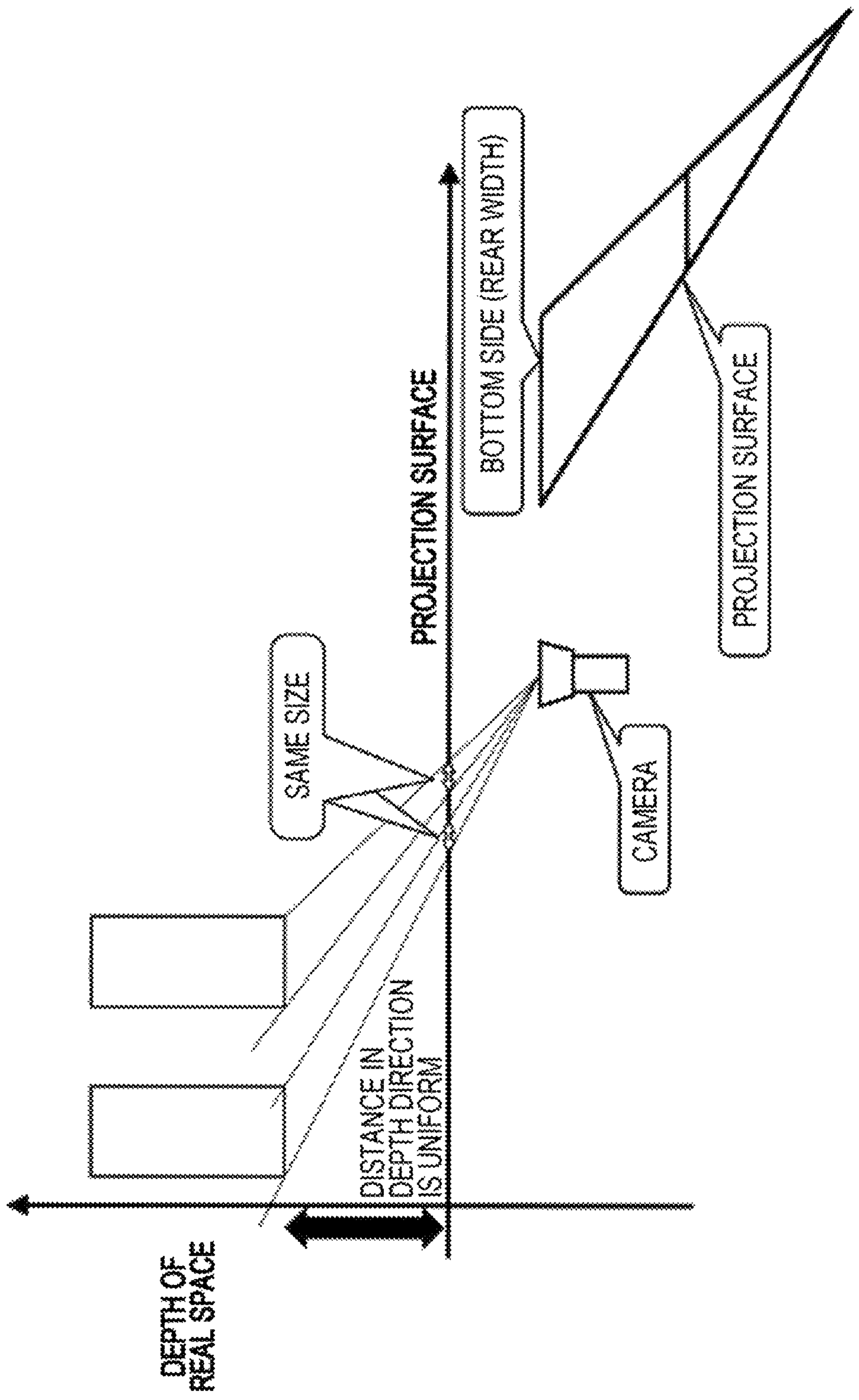
FIG. 3 is a diagram for explaining a relationship of appearance between a camera and an object.
Figure 4:
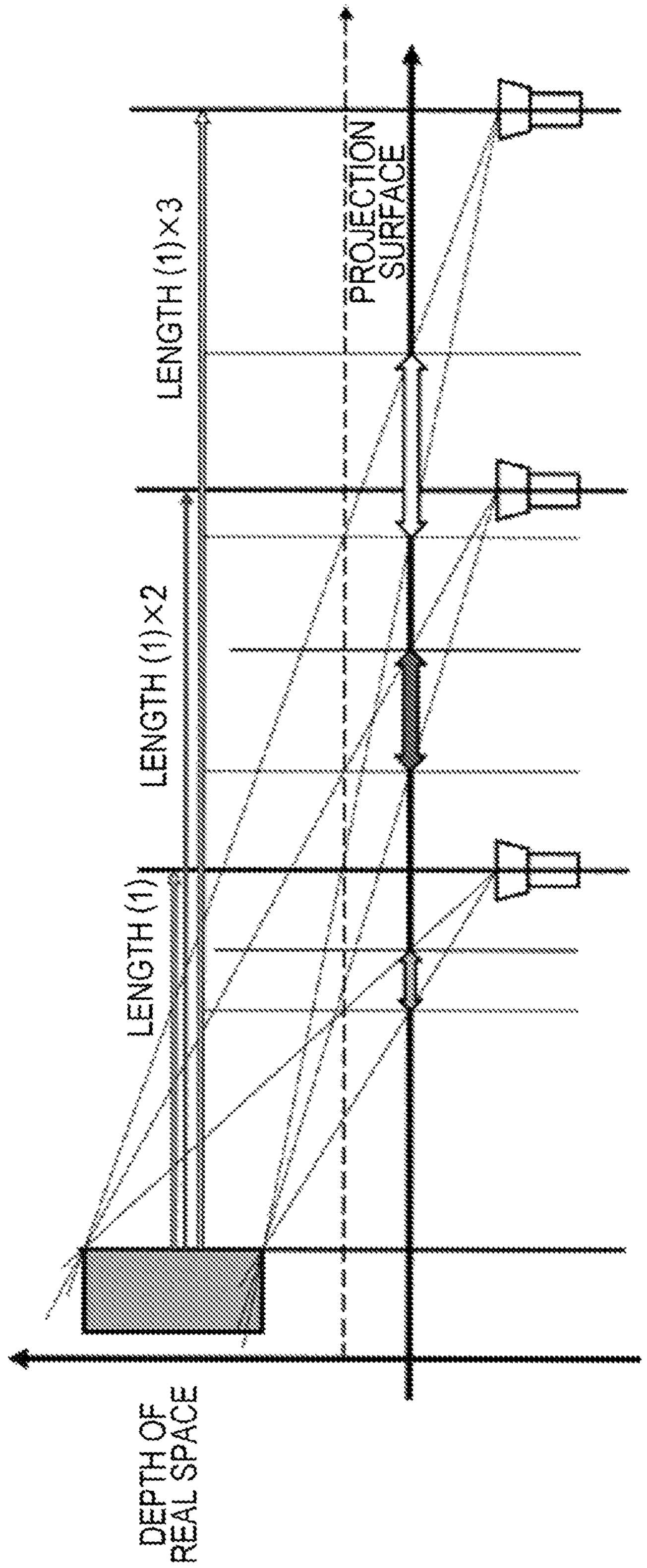
FIG. 4 is a diagram for explaining a relationship of appearance between a plurality of laterally slid cameras and an object.

FIG. 3 is a diagram for explaining a relationship of appearance between a camera and an object. If it is assumed that there is no distortion of the lens, in the region where the camera is photographing, surfaces parallel to the projection surface appear in the same size if the surfaces are at the same distance in the depth direction. This is because the camera and the projection surface can be expressed by similarity of a triangle, and the length and the height of the base have the same value. FIG. 4 is a diagram for explaining a relationship of appearance between a plurality of laterally slid cameras and an object. The side surface appears larger when the distance between the object and the camera increases in the lateral direction of the image. With the side surface as a base, a triangle having a height twice or three times is formed, and the distance to the projection surface is also twice or three times. As described above, the subject surface (for example, the vehicle width of another vehicle) parallel to the projection surface appears in the same size regardless of the direction in which the subject appears when the distance from the camera to the parallel subject surface is the same. There is a characteristic that the subject surface in the depth direction with respect to the projection surface (for example, the vehicle length of another vehicle) appears larger in a case where the subject appears at a position closer to the end from the front of the camera.

Figure 5:
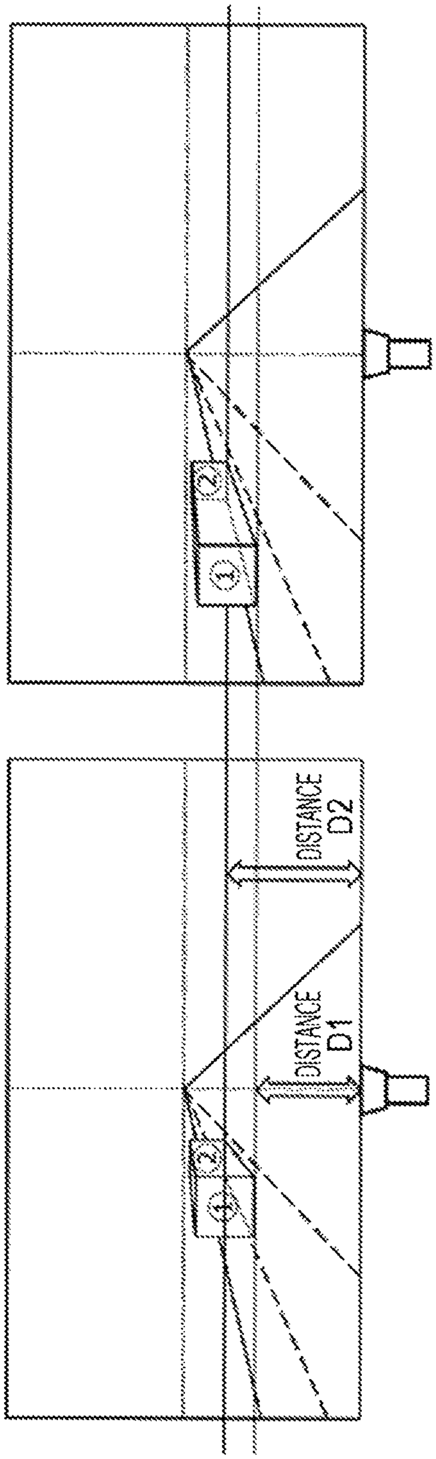
FIG. 5 is a diagram illustrating an example in which a feature photographed by a camera is a rectangular parallelepiped or the feature is captured as a rectangular parallelepiped.

FIG. 5 is a diagram illustrating an example in which a feature photographed by a camera is a rectangular parallelepiped or the feature is captured as a rectangular parallelepiped. At this time, there are the following characteristics. For features existing in places at the same distance D to the camera in the depth direction, the length and area of the sides of the rear surface of the rectangular parallelepiped in (1) and the back surface of (2) are constant regardless of the movement in the image lateral direction. On the left and right of FIG. 5, the sizes of (1) and the sizes of (2), that is, the lengths of the sides and the areas are the same. As similar to this, the ratio of the sizes of the rear surface and the back surface, that is, the reduction ratio depends on the changes in the distance D1 and the distance D2. Therefore, for example, in the case of rectangles having the same entire length, the reduction ratio is constant regardless of the sizes of (1) and (2) and the position of the image in the horizontal axis direction. As similar to the partition line or the like, a line segment constituting a side surface of the surface of the rectangular parallelepiped converges to a vanishing point.

Figure 6:
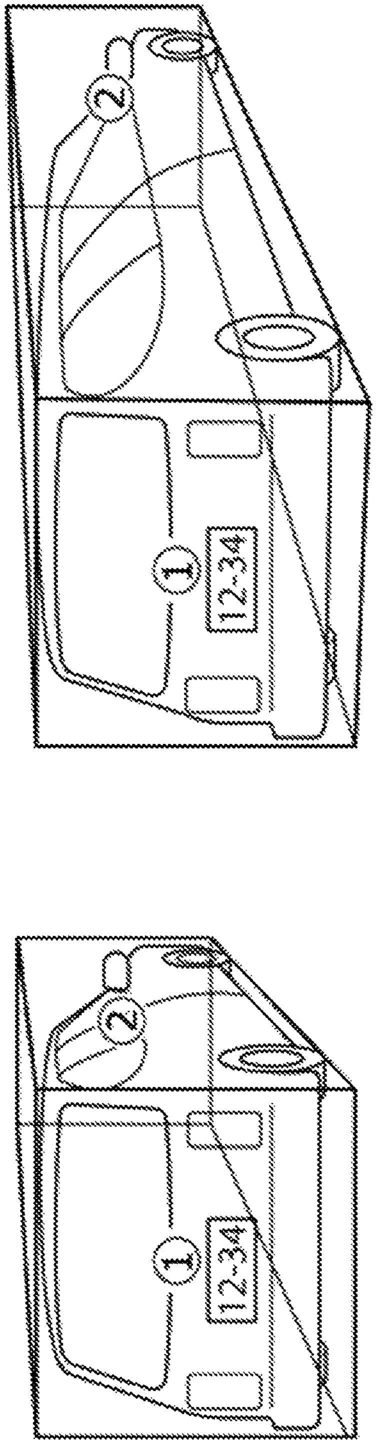
FIG. 6 is a diagram illustrating an example of a case where a vehicle is captured as a target feature and a circumscribed rectangular parallelepiped corresponding to the vehicle is drawn in a video imaged by an in-vehicle camera installed so as to photograph the front of the observation vehicle.

FIG. 6 is a diagram illustrating an example of a case where a vehicle is captured as a target feature and a circumscribed rectangular parallelepiped corresponding to the vehicle is drawn in a video imaged by an in-vehicle camera installed so as to image the front of the observation vehicle. In this case, when a circumscribed rectangular parallelepiped of the vehicle is drawn, there is the following characteristics. Regarding the vehicle, it is assumed that there is a surface (1) corresponding to a position where the distance D to the camera in the depth direction is the same, here, a "vehicle rear portion (hereinafter, rear)", and there is a surface (2) corresponding to a corresponding "vehicle front portion (hereinafter, front)". At this time, a reduction ratio by a ratio of the sizes of the surface (1) and the surface (2) is determined by a difference between the distance D2 and the distance D1, that is, the entire length of the vehicle. The circumscribed rectangular parallelepiped has the same entire length, and for example, if the entire length is 4.8 m and is uniform, the same reduction ratio is obtained regardless of a different vehicle name or a different vehicle type and whether the traveling lane is adjacent by one lane or adjacent by two lanes.

Figure 7:
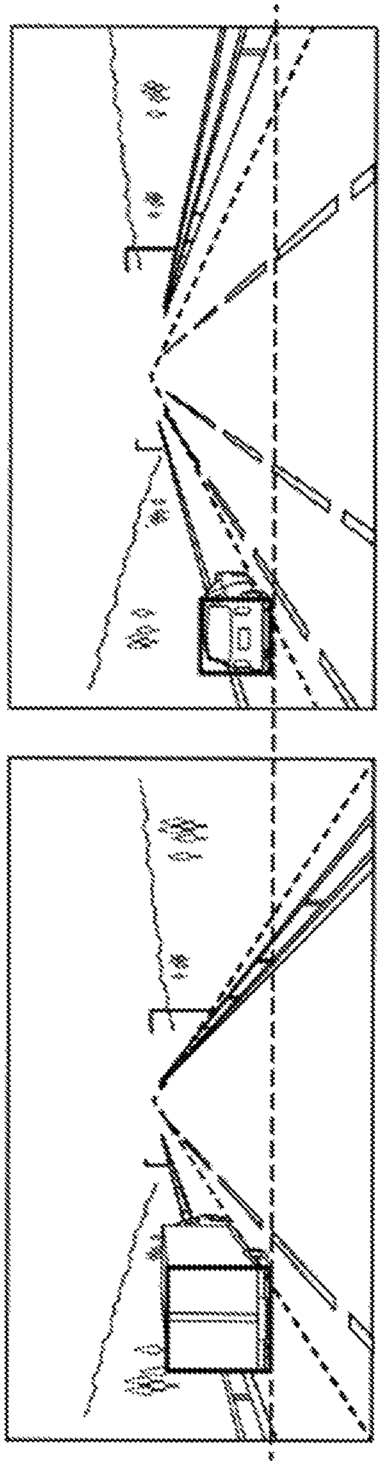
FIG. 7 is a diagram illustrating an example of a case where images of different vehicle types are compared.

FIG. 7 is a diagram illustrating an example of a case where images of different vehicle types are compared. As illustrated in FIG. 7, even in a case where the traveling lanes are different and the vehicle travels not at the center but at the end in the lane, the entire length can be obtained by the same calculation formula even in a case where the vehicle type is different, that is, the width of the vehicle is different and the appearance of the side surface is different. Even in the case of a middle-sized truck adjacent by one lane on the left in FIG. 7 and a passenger car adjacent by two lanes on the right in FIG. 7, as described above, if the distance D is the same, the reduction ratios of the surface (1) and the surface (2) depend only on the entire length. The technology of the present embodiment is a technology utilizing the characteristics of such a principle.

Hereinafter, a configuration of the present embodiment will be described.

Figure 8:
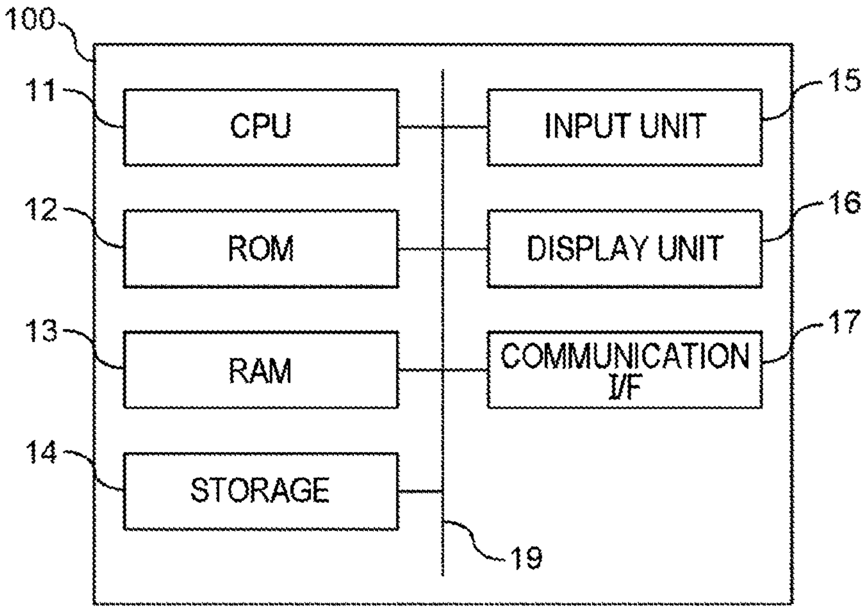
FIG. 8 is a block diagram illustrating a hardware configuration of a dimension estimation device.

FIG. 8 is a block diagram illustrating a hardware configuration of a dimension estimation device 100.

As illustrated in FIG. 8, the dimension estimation device 100 includes a central processing unit (CPU) 11, a read only memory (ROM) 12, a random access memory (RAM) 13, a storage 14, an input unit 15, a display unit 16, and a communication interface (I/F) 17. The components are communicatively connected to each other via a bus 19.

The CPU 11 is a central processing unit and executes various programs and controls each unit. That is, the CPU 11 reads a program from the ROM 12 or the storage 14, and executes the program by using the RAM 13 as a work area. The CPU 11 controls each component described above and performs various types of calculation processing according to the program stored in the ROM 12 or the storage 14. In the present embodiment, a dimension estimation program is stored in the ROM 12 or the storage 14.

The ROM 12 stores various programs and various types of data. The RAM 13 temporarily stores programs or data as a work area. The storage 14 includes a storage device such as a hard disk drive (HDD) or a solid state drive (SSD) and stores various programs including an operating system and various types of data.

The input unit 15 includes a pointing device such as a mouse and a keyboard, and is used to perform various inputs.

The display unit 16 is, for example, a liquid crystal display and displays various types of information. The display unit 16 may function as the input unit 15 by adopting a touch panel system.

The communication interface 17 is an interface communicating with another device such as a terminal. For the communication, for example, a wired communication standard such as Ethernet (registered trademark) or FDDI, or a wireless communication standard such as 4G, 5G, or Wi-Fi (registered trademark) is used.

Figure 9:
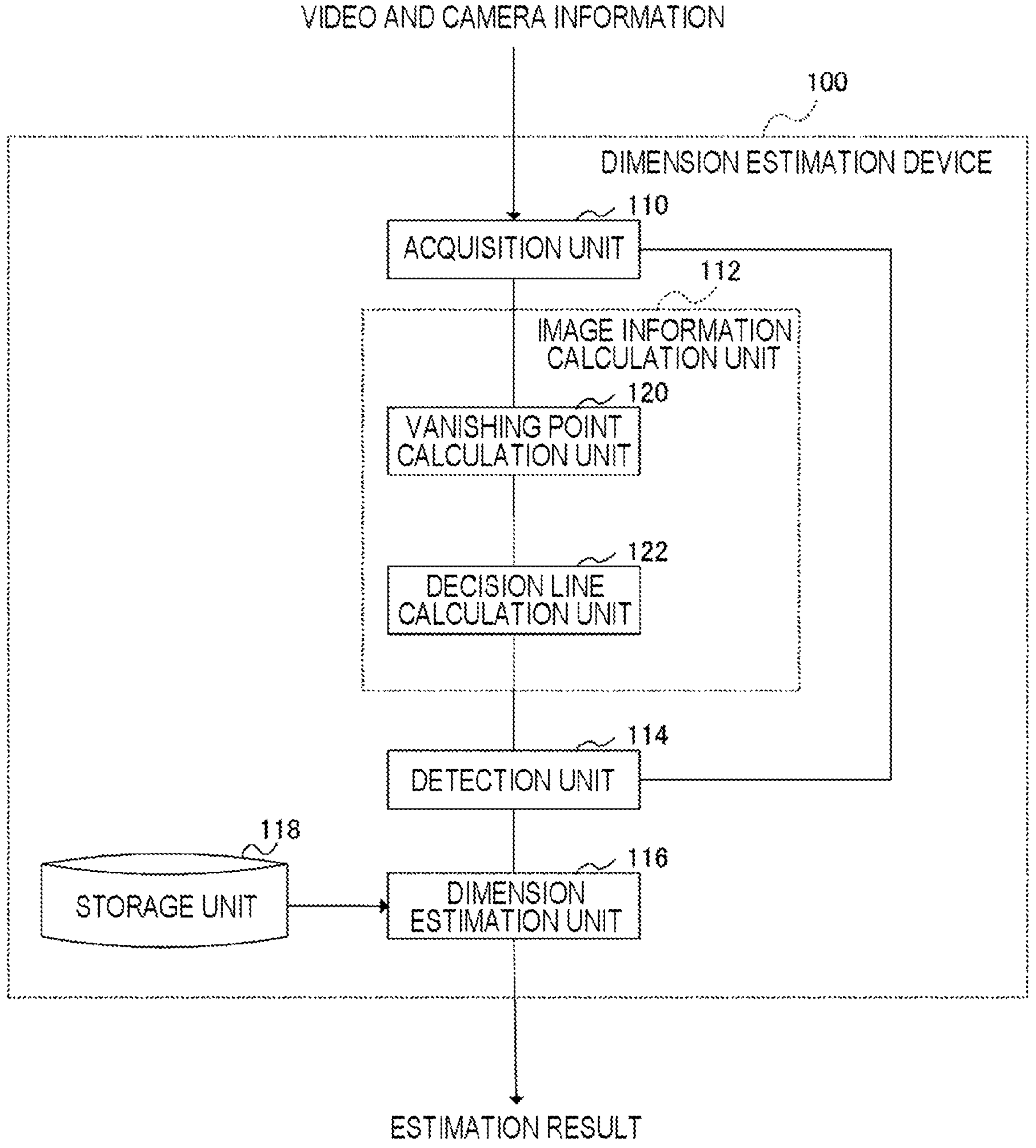
FIG. 9 is a block diagram illustrating a functional configuration of the dimension estimation device of the present embodiment.

Next, each functional configuration of the dimension estimation device 100 will be described. FIG. 9 is a block diagram illustrating a configuration of the dimension estimation device according to the present embodiment. Each functional configuration is achieved by the CPU 11 reading the dimension estimation program stored in the ROM 12 or the storage 14, and loading and executing the dimension estimation program in the RAM 13.

As illustrated in FIG. 9, the dimension estimation device 100 includes an acquisition unit 110, an image information calculation unit 112, a detection unit 114, a dimension estimation unit 116, and storage unit 118. The image information calculation unit 112 includes a vanishing point calculation unit 120 and a decision line calculation unit 122.

Figure 10:
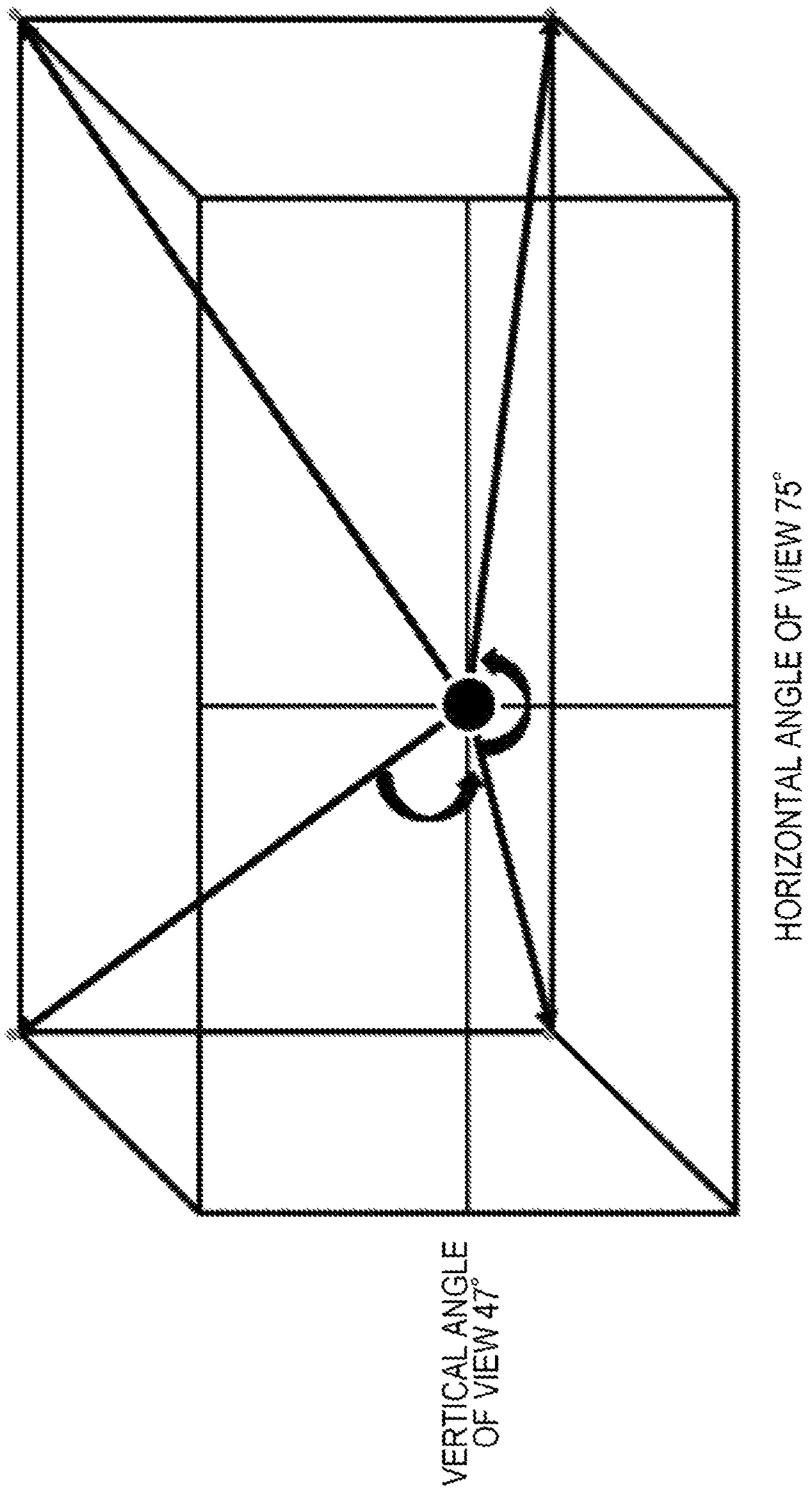
FIG. 10 is a diagram schematically illustrating camera information of the in-vehicle camera.

The acquisition unit 110 acquires time-series images from the video imaged by the in-vehicle camera of the observation vehicle. The time-series images are frame-by-frame images. Further, the acquisition unit 110 acquires camera information of the in-vehicle camera that has imaged the video. The camera information includes information on coordinates of an installation position of the in-vehicle camera. FIG. 10 is a diagram schematically illustrating camera information of the in-vehicle camera. As an example, it is assumed that the in-vehicle camera is on the front side, is installed facing the back side, is installed at a position of 1.32 m from the road surface, and is horizontal. In addition, it is assumed that the vertical angle of view is 47° and the horizontal angle of view is 75°.

The image information calculation unit 112 calculates a vanishing point and a decision line of an image by processing of each unit.

Figure 11:
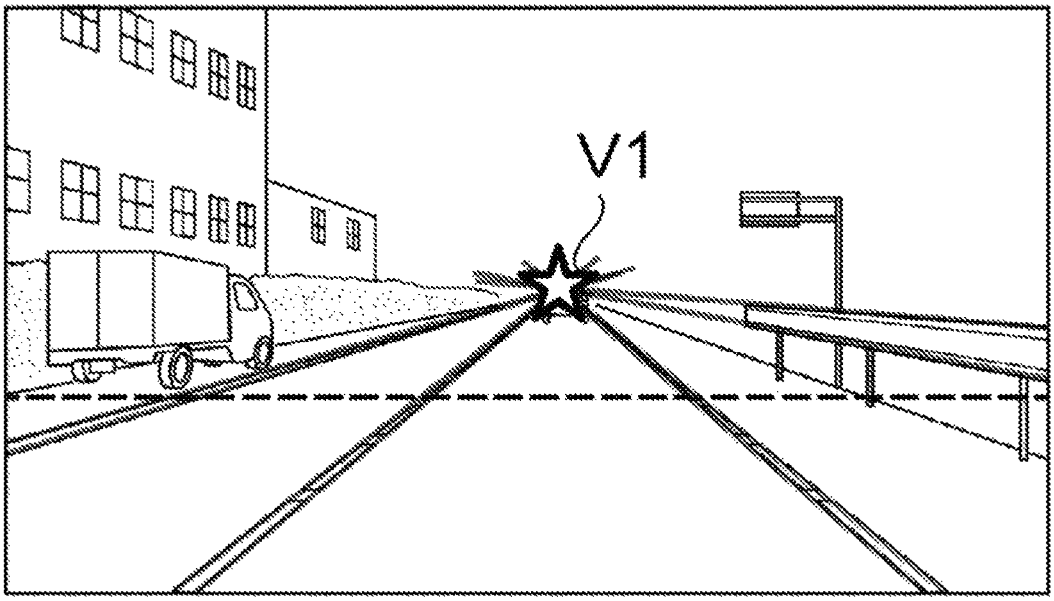
FIG. 11 is a diagram illustrating an example of a vanishing point in an image.

The vanishing point calculation unit 120 calculates a vanishing point from the image acquired by the acquisition unit 110. The vanishing point calculation unit 120 detects straight lines in the image by using Hough transform, probabilistic Hough transform, or the like to extract straight line components, and performs extension processing as necessary to obtain an intersection point between the straight lines and calculate a vanishing point. For the calculation of the vanishing point, for example, when it is known that the road on which the vehicle is traveling curves left and right, the processing may be performed with the range limited so as to use only the straight line component detected in the lower region of the image having less influence of the curve. FIG. 11 is a diagram illustrating an example of a vanishing point in an image. First, (1) a plurality of straight lines by a partition line and a structure such as a building in the image are detected. (2) A plurality of straight lines are extended, intersections thereof are obtained, and a point at which the straight lines intersect becomes a vanishing point (V1). In practice, straight lines that do not extend to the vanishing point, such as the longitudinal straight lines in the zebra zone and the rear of the light truck, are also detected. Therefore, processing is performed such that an intersection where lines obtained by extending each straight line intersect most is set as a vanishing point. In addition, it is also necessary to supplementarily add processing of carefully selecting a straight line to be an intersection target from information such as inclination of the straight line in the image. It is assumed that the in-vehicle camera is installed so as to face horizontally and right in front, and the vanishing point is located at the center when the vehicle is traveling on a straight line. Therefore, the vanishing point may be substituted by the central coordinates of the image.

Figure 12:
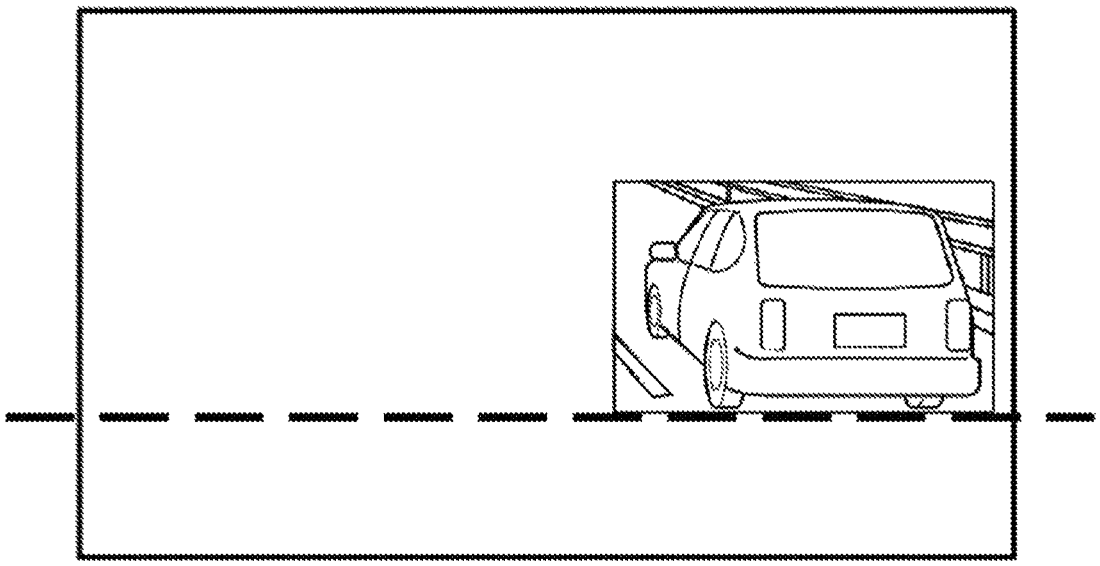
FIG. 12 is a diagram illustrating an example of a decision line provided at any coordinates on an image.
Figure 13:
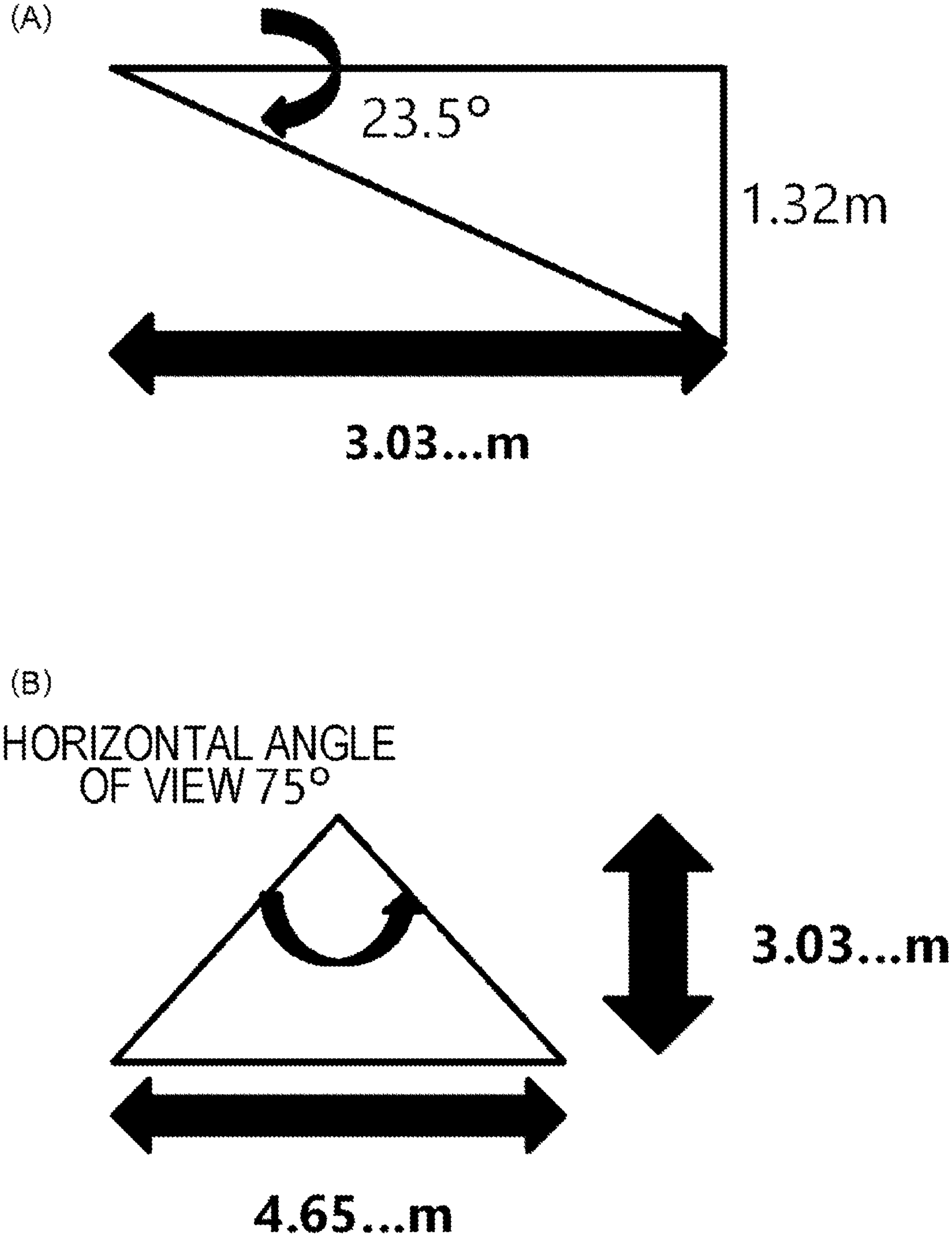
FIG. 13 is a diagram illustrating a relationship of an angle of view in calculation of a photographable range.
Figure 14:
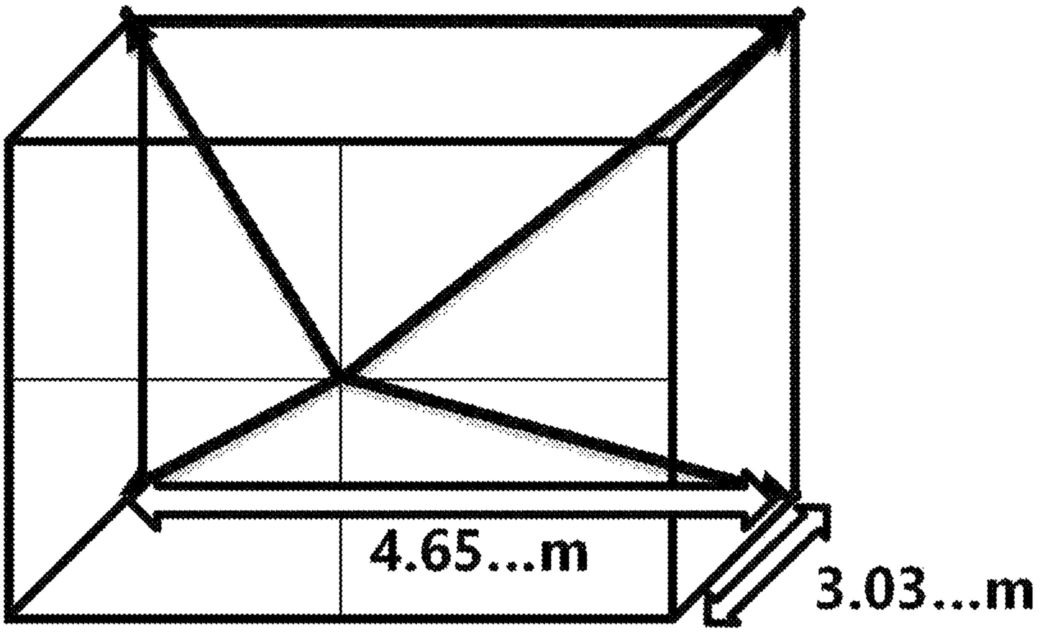
FIG. 14 is a diagram illustrating an example of a calculated photographable range.
Figure 15:
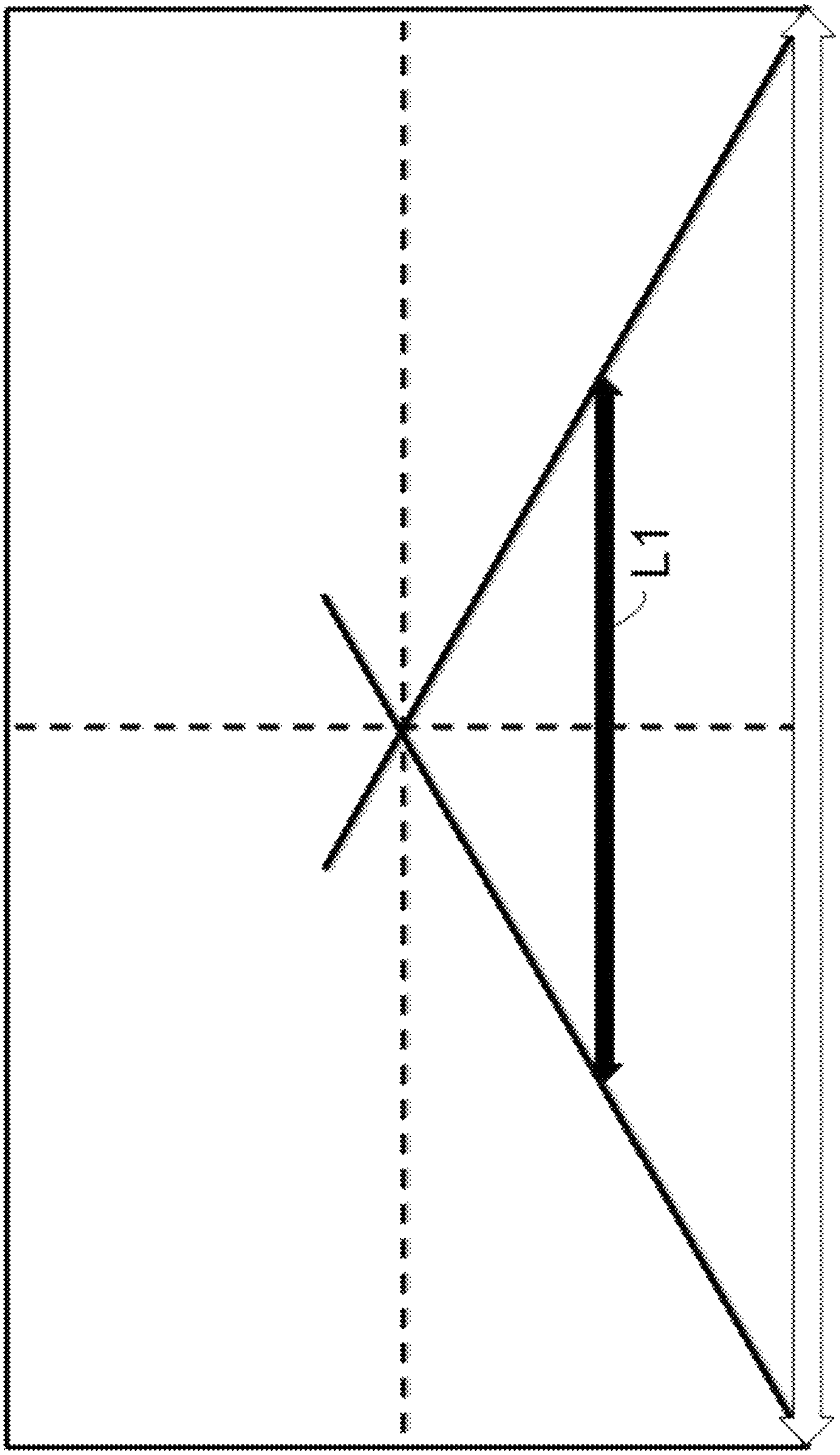
FIG. 15 is a diagram illustrating an example of an assumption of a decision line in an image.

The decision line calculation unit 122 calculates the photographable range from the position and the angle of view of the camera in the camera information acquired by the acquisition unit 110, and calculates the decision line by drawing a line at a position half the distance of the lower part of the photographable range in the image. FIG. 12 is a diagram illustrating an example of a decision line provided at any coordinates on an image. In this example, the decision line is in proximity to the feature, and the distance to the decision line corresponds to the distance D. The distance D may be set to any coordinate. Other setting methods will be described later. FIG. 13 is a diagram illustrating a relationship of an angle of view in calculation of a photographable range. In the image photographed by the in-vehicle camera, the downward direction can be seen at an angle of ½ of the vertical angle of view of 47° as illustrated in (A) of FIG. 13. The lower end of the image can be calculated to be 3.03 . . . m ahead of the camera. When the height is obtained at an angle of ½ of the horizontal angle of view of 75° and doubled as in (B), it can be calculated that a width of 4.65 . . . m can be seen in the lateral direction of the in-vehicle camera. FIG. 14 is a diagram illustrating an example of a calculated photographable range. FIG. 15 is a diagram illustrating an example of an assumption of a decision line in an image. A line is drawn from the left and right corners of the lower part of the image toward the vanishing point, and the position that is half the length of the lower part of the image is twice the distance from the camera to the lower part of the image, that is, 6.07 . . . m in this example. The decision line calculation unit 122 draws the decision line (L1) at this position.

Regarding the calculation of the decision line, for example, in a case where the road surface is not flat and there is an inclination, the inclination may be considered. On the other hand, if the inclination is about 10 m ahead, the change in height may be regarded as minor, and the influence may not be considered. Regarding the calculation of the decision line, instead of calculating the decision line on the basis of the height of the in-vehicle camera from the road surface, marking may be performed on the road surface in front of the in-vehicle camera at regular intervals, and the coordinates on the image at which the distance from the in-vehicle camera is constant may be set to be the decision line regardless of the height of the in-vehicle camera. The calculation of the vanishing point and the calculation of the decision line may be calculated by extracting a part of the image in the entire video, and in the case of the video of the same vehicle, the coordinate information calculated once may be reused.

Figure 16:
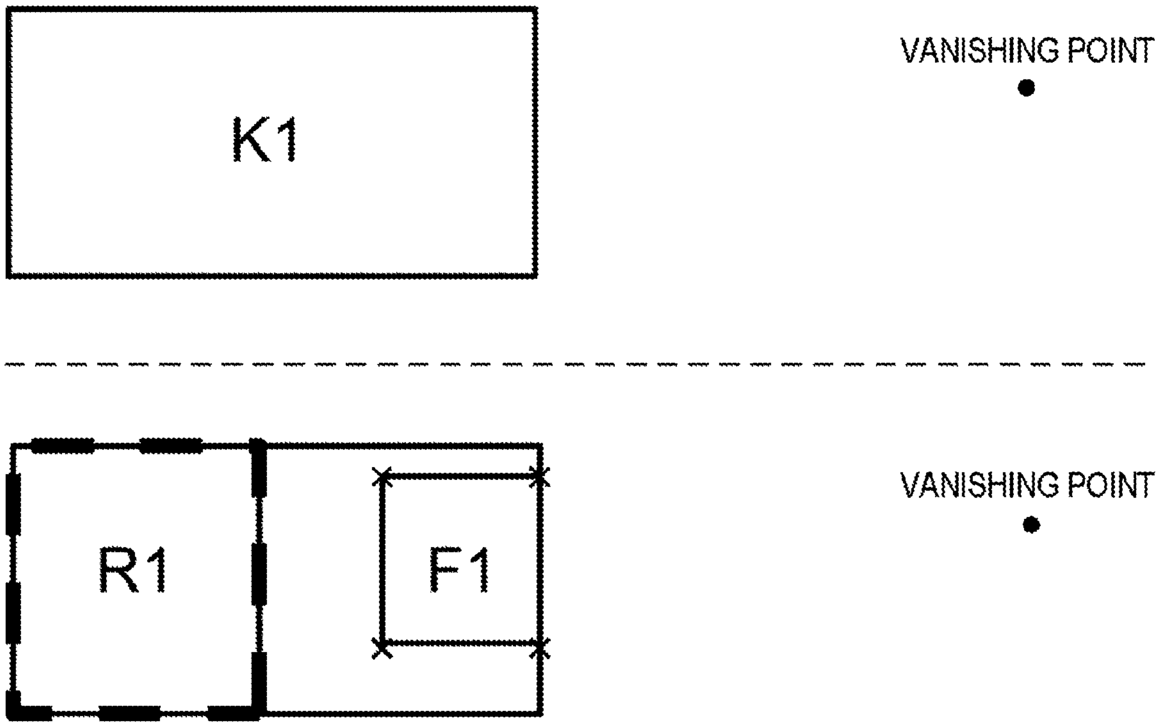
FIG. 16 is a diagram schematically illustrating a relationship between a detection rectangle and a vanishing point.
Figure 17:
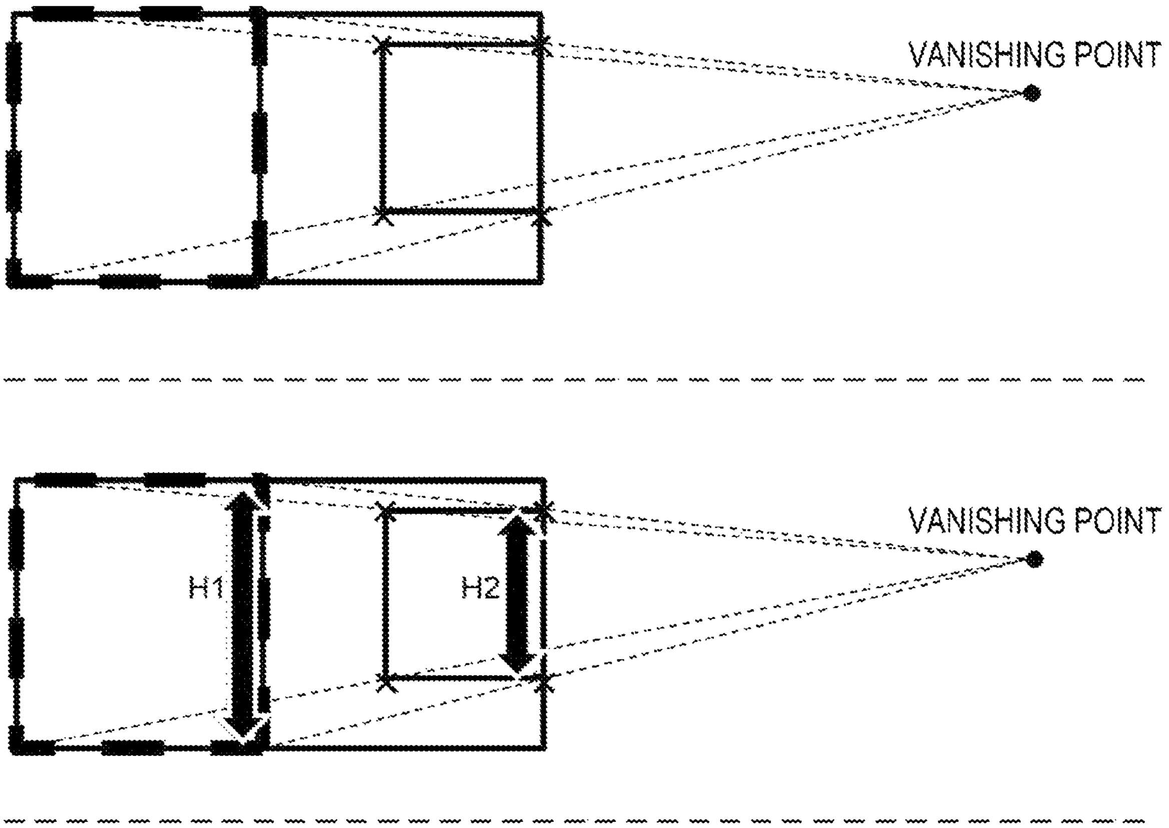
FIG. 17 is a diagram schematically illustrating a relationship between a detection rectangle and a vanishing point.

Next, an outline of processing related to the following detection unit 114 and dimension estimation unit 116 will be described with reference to FIGS. 16 and 17. FIGS. 16 and 17 are diagrams schematically illustrating a relationship between a detection rectangle and a vanishing point.

The detection unit 114 detects an object in the image, and detects a detection rectangle that is a rectangle including the first surface in proximity to the decision line. The first surface is a surface close to the photographing position, and conversely, is a surface far from the vanishing point. In the example, the first surface is the rear side. The second surface is a surface far from the photographing position, and conversely, is a surface close to the vanishing point. In the example, the second surface is the front side. In the subsequent processing, as illustrated in FIG. 12, the processing of estimating the dimension is performed using the extracted image in which the decision line and the lower end coordinate of the detection rectangle in which the object has been detected match. Inputs in the detection unit 114 are a time-series image, a vanishing point, and a decision line.

The dimension estimation unit 116 estimates a dimension of another object on the basis of a reduction ratio being a ratio between the height of the first surface and the height of the second surface obtainable from a relationship between the detection rectangle and the vanishing point. Inputs in the dimension estimation unit 116 are an extracted image, a vanishing point, a decision line, and information on the coordinates of the detection rectangle.

The storage unit 118 stores a linear proportional equation corresponding to the distance D.

The detection unit 114 detects another vehicle as an object by an object detection technology, and detects a detection rectangle. In the present embodiment, since the detection rectangle of the vehicle is calculated on the image, the information on the coordinates of the rectangular shape (K1) of the plane of FIG. 16 is detected.

The detection unit 114 further detects an object on a "rear surface (rear)" of the vehicle. As illustrated in FIG. 16, the "rear surface (rear)" is superimposed on the detection rectangle of another vehicle. The second surface (F1) of the front illustrated in FIG. 16 is not detected by the detection unit 114 but assumed for convenience of description. In practice, the rectangle of the "front" is obtained from the reduction ratios of the rear and the front by the dimension estimation unit 116 described later. It is also possible to express the circumscribed rectangular parallelepiped of the target, and it is also possible to calculate the reduction ratio again using a line segment on the back side which is not shown in the video by clarifying the entire line segment.

The positional relationship between R1 and F1 exists on a straight line facing the direction of the vanishing point. Here, a case where the entire length of the front vehicle traveling in the same direction as the observation vehicle is obtained using the video of the in-vehicle camera on the front side is taken as an example. However, actually, an oncoming vehicle also exists in the video, and the front may appear as the first surface. When the rear camera is used, the front of the following vehicle traveling in the same direction as the observation vehicle also appears as the first surface. Therefore, the detection unit 114 may detect not only the rear but also the front.

The dimension estimation unit 116 estimates a dimension using the detection rectangle. As illustrated in FIG. 17, the dimension estimation unit 116 calculates line segments connecting the four corners of the detection rectangle of the rear (R1) and the vanishing point. This straight line is a side component of the circumscribed rectangular parallelepiped. In practice, it is not necessary to obtain from all the four corners, and since the line segments to be used change between left and right depending on whether the vehicle is on the right or left of the vanishing point, it is sufficient that four line segments are obtained in advance and used separately as necessary. Intersections between the straight line components and the detection rectangle as the object of the vehicle obtained first are obtained on the left and right, and a line connecting these intersections corresponds to one side of F1 of the circumscribed rectangular parallelepiped.

The height (H1) of the detection rectangle of R1 and the length (H2) of the line segment corresponding to the height of F1 of the circumscribed rectangular parallelepiped are obtainable. Then, the ratio of these is obtained as reduction ratio=H2/H1. Here, as described above, the height of the circumscribed rectangular parallelepiped changes depending on the distance D, but the change is inversely proportional. The dimension estimation unit 116 obtains the entire length of the circumscribed rectangular parallelepiped of the target from the expression stored in the storage unit 118 and the obtained reduction ratio. The smaller the size is, that is, the smaller the H2/H1 is, the longer the entire length is.

A method of estimating the entire length dimension will be described. As illustrated in FIG. 5 described above, when the distance from the bottom of the image to the decision line is D1 and the distance to F1 of the circumscribed rectangular parallelepiped is D2, the reduction ratio is expressed by the following Expression (1).

[Math. 1]

$$\text{Reduction rate} = \frac{1}{\left(\frac{D2}{D1}\right)} \tag{1}$$

Here, since D2 is the entire length of D1+the target, the entire length (dimension) of the target can be obtained by the following Expression (2) by modifying Expression (1).

[Math. 2]

$$\text{Entire length of target} = D1\left(\frac{1}{\text{Reduction rate}} - 1\right) \tag{2}$$

Next, the action of the dimension estimation device 100 will be described.

Figure 18:
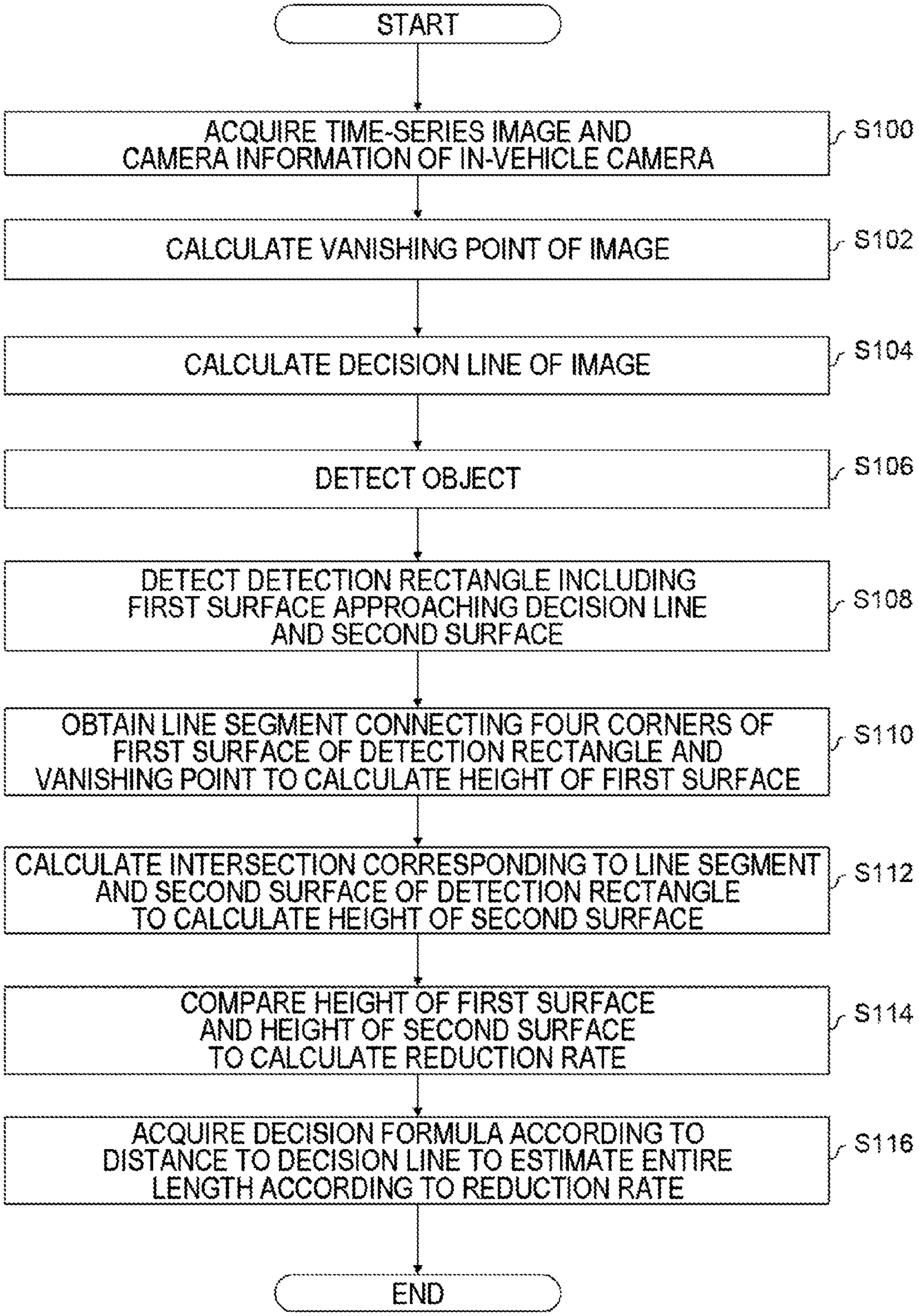
FIG. 18 is a flowchart of a flow of dimension estimation by a dimension estimation device.

FIG. 18 is a flowchart of a flow of dimension estimation by the dimension estimation device 100. The CPU 11 reads the dimension estimation program from the ROM 12 or the storage 14 and develops and executes the position estimation program in the RAM 13, thereby performing the dimension estimation processing.

In step S100, the CPU 11, as the acquisition unit 110, acquires time-series images and camera information of the in-vehicle camera from the video captured by the in-vehicle camera of the observation vehicle.

In step S102, the CPU 11, as the image information calculation unit 112, calculates a vanishing point of the image. Details of the action of the vanishing point calculation by the vanishing point calculation unit 120 will be described later.

In step S104, the CPU 11, as the image information calculation unit 112, calculates a decision line of the image. Details of the action of the decision line calculation by the decision line calculation unit 122 will be described later.

In step S106, the CPU 11, as the detection unit 114, detects an object in the image by using an object detection technology.

In step S108, the CPU 11, as the detection unit 114, detects a detection rectangle that is a rectangle including the first surface in proximity to the decision line for the object from each of the images. As a result, an extracted image including the first surface in proximity to the decision line is obtained, and this extracted image is used in the subsequent processing.

In step S110, the CPU 11, as the dimension estimation unit 116, obtains line segments connecting the four corners of the first surface of the detection rectangle and the vanishing point, and calculates the height of the first surface.

In step S112, the CPU 11, as the dimension estimation unit 116, calculates an intersection corresponding to the line segment and the second surface of the detection rectangle, and calculates a line connecting the intersections as the height of the second surface corresponding to the height of the front.

In step S114, the CPU 11, as the dimension estimation unit 116, compares the height of the first surface with the height of the second surface to calculate the reduction ratio.

In step S116, the CPU 11, as the dimension estimation unit 116, acquires the decision formula from the storage unit 118 according to the distance to the decision line, estimates the entire length according to the reduction ratio, and outputs the estimation result.

Figure 19:
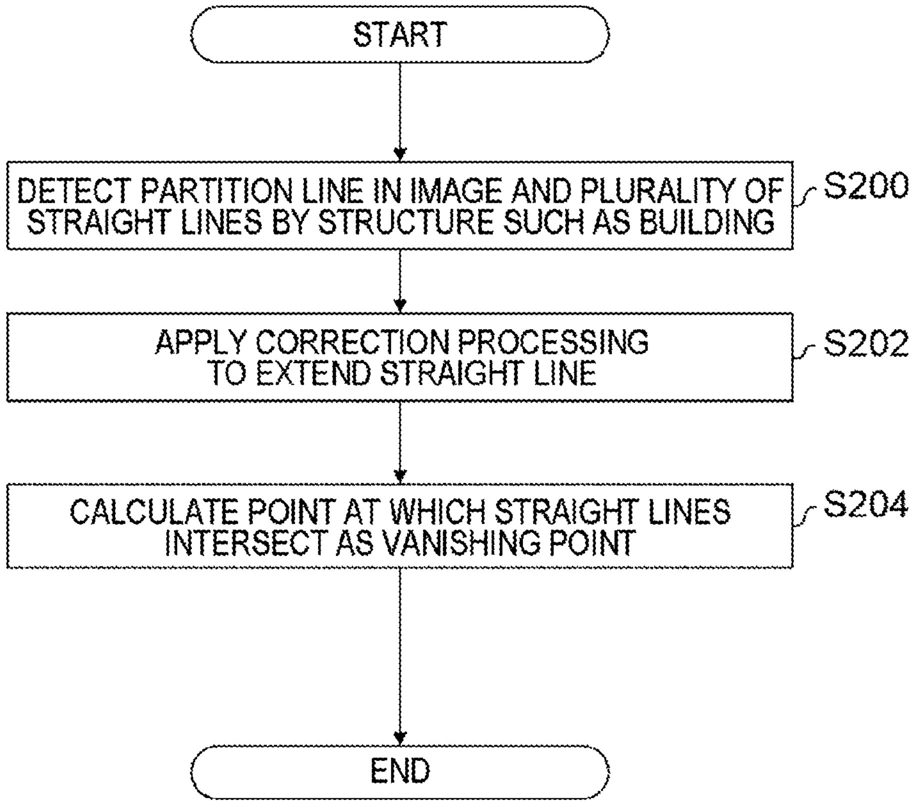
FIG. 19 is a flowchart of calculation of the vanishing point.

The calculation of the vanishing point will be described with reference to FIG. 19. The input in the calculation of the vanishing point by the vanishing point calculation unit 120 is an image.

In step S200, the CPU 11, as the vanishing point calculation unit 120, detects a partition line in the image and a plurality of straight lines by a structure such as a building by using Hough transform, probabilistic Hough transform, or the like.

In step S202, the CPU 11 performs correction processing on the straight line as necessary to extend the straight line.

In step S204, the CPU 11 calculates a point at which the straight lines intersect as a vanishing point.

Figure 20:
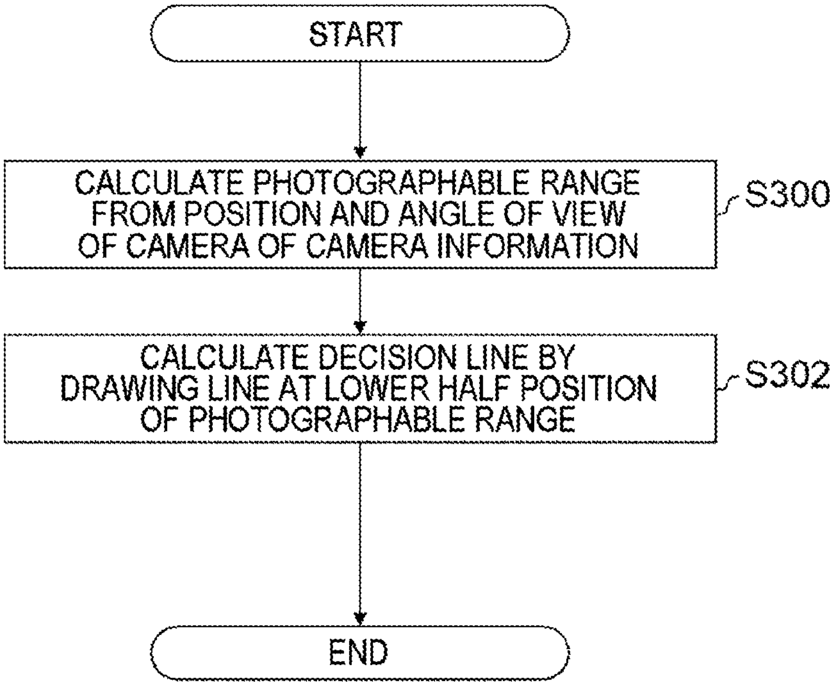
FIG. 20 is a flowchart of calculation of the decision line.

The calculation of the decision line will be described with reference to FIG. 20. The input of the calculation of the decision line in the decision line calculation unit 122 is camera information.

In step S300, the CPU 11, as the decision line calculation unit 122, calculates the photographable range from the position and the angle of view of the camera in the camera information.

In step S302, the CPU 11, as the decision line calculation unit 122, calculates a decision line by drawing a line at the lower half position of the photographable range.

As described above, according to the dimension estimation device 100 of the present embodiment, a dimension of another object on a road can be accurately estimated.

Figure 21:
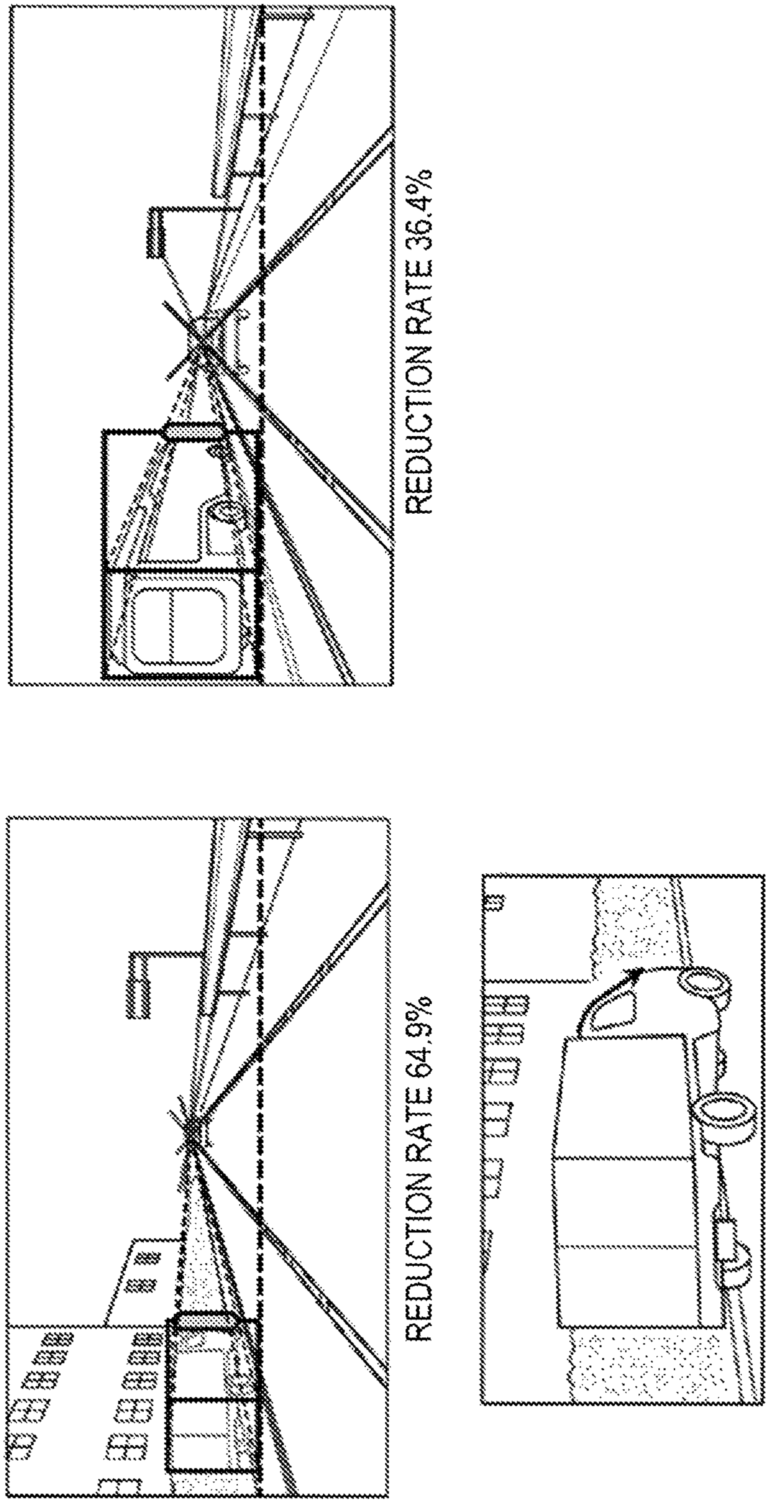
FIG. 21 is a diagram illustrating an application example of a method of the present embodiment.

When the present embodiment is applied, as illustrated in the example of FIG. 21, the reduction ratio is different between the circumscribed rectangular parallelepiped of the light truck of about 3.4 m and the circumscribed rectangular parallelepiped of the bus of about 10 m.

Figure 22:
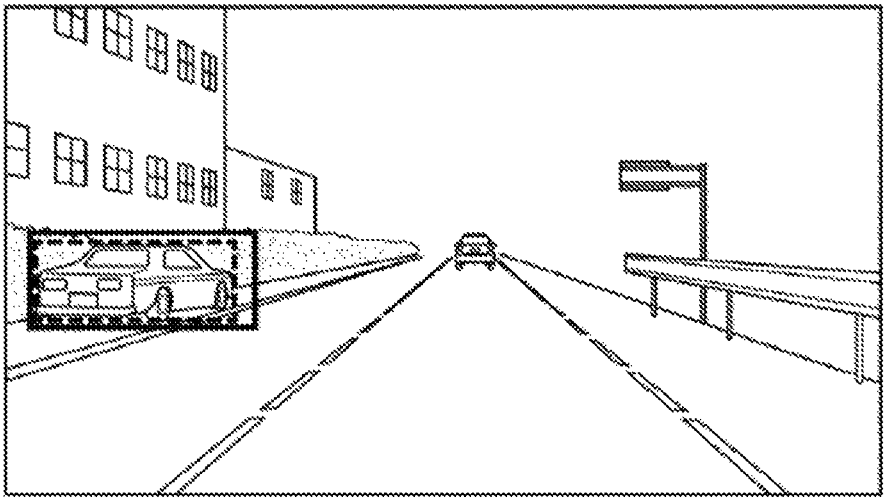
FIG. 22 is a diagram illustrating evaluation of a method of the present embodiment.
Figure 22:
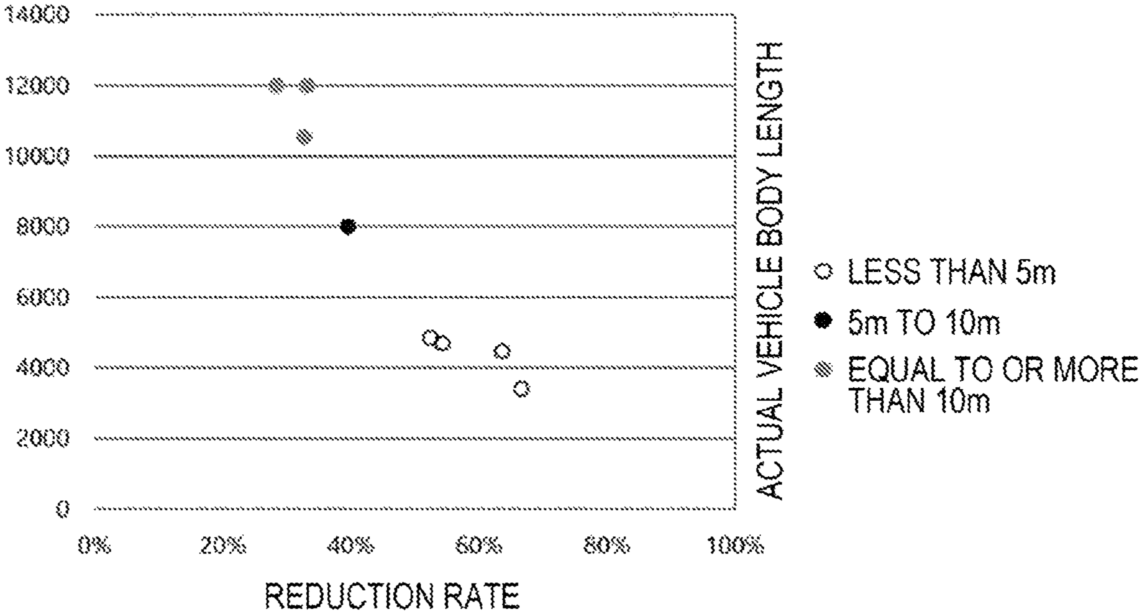

Evaluation of the method of the present embodiment will be described with reference to FIG. 22. In the embodiment, the dimension (entire length) is required, but in practice, the shape of the object detection is not necessarily detected as ideal. Therefore, only classification such as "5 m or less, 5 to 10 m or more, 10 m or more" may be performed. Although the processing and the expression on the premise that the distance to the decision line is known or is obtained by another means are described, the present embodiment is not limited thereto. It may be substituted by accumulating data of reduction ratios of other vehicles included in the video and deciding when the distance from the distribution to the decision line is close to the graph, or the decision line may be obtained and utilized by the same method.

Figure 23:
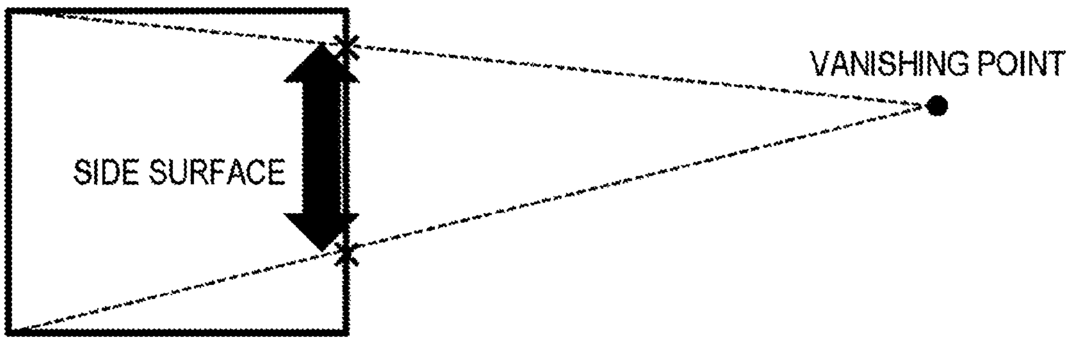
FIG. 23 is a diagram illustrating an example in which a line segment is drawn on a side surface of an object.

For convenience of description, in the above example, the feature is described as a circumscribed rectangular parallelepiped, but the present invention is not limited thereto. As illustrated in FIG. 23, the similar processing can be performed even if only the "side surface" of the feature is detected as the object. For example, the detection unit 114 may detect the detection rectangle including the side surface of the object, and the dimension estimation unit 116 may calculate the height of the first surface and the height of the second surface with respect to the side surface by drawing line segments connecting four corners on a side far from the vanishing point of the detection rectangle and the vanishing point. In this case, it is sufficient that the side surface is shown even if the rear can be seen only partially, which results in increased distance to the supportable target.

Figure 24:
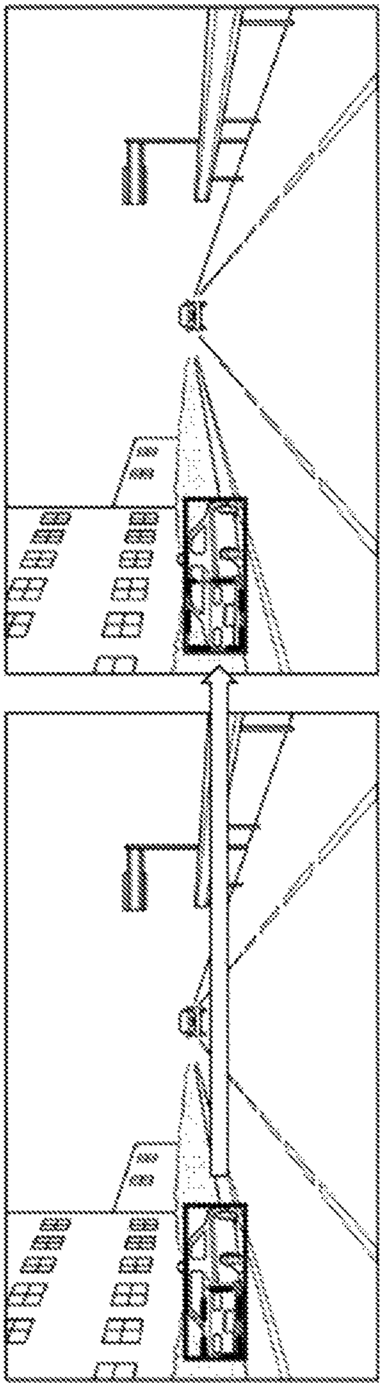
FIG. 24 is a diagram illustrating an example of evaluation of a taxi.

As illustrated in FIG. 24, when the target has a shape in which the rear and the front do not have a height as high as the central portion of the vehicle, for example, a taxi or the like, the height of the detection rectangle of the rear may be smaller than that of the detection rectangle of the vehicle. In this case, a measure may be added in which the obtained rear surface is expanded in the vertical direction of the image and adjusted so as to have the same height as the detection rectangle of the vehicle.

Figure 25:
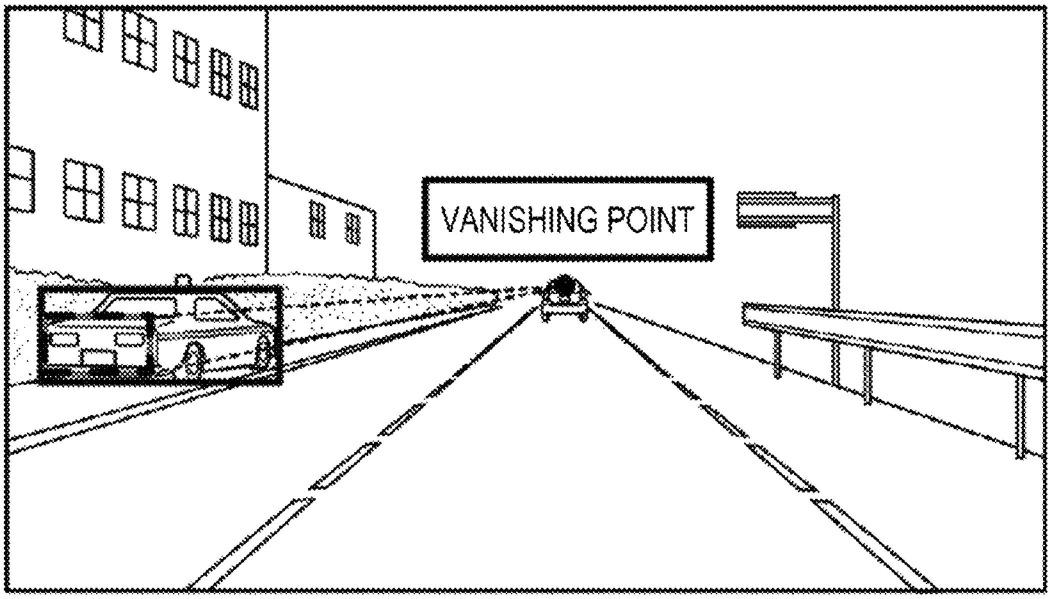
FIG. 25 is a diagram illustrating an example of evaluation of a taxi.

The method using the circumscribed rectangular parallelepiped of the target has been exemplified, but another rectangular parallelepiped may be used. As illustrated in FIG. 25, when the target has a shape in which the rear and the front do not have a height as high as the central portion of the vehicle, for example, a taxi or the like, the height of the detection rectangle of the rear may be smaller than that of the detection rectangle of the vehicle. In this case, similarly, by drawing a straight line toward the vanishing point, an inscribed rectangular parallelepiped having the detection rectangle of the rear with respect to the vehicle as the first surface is formed, and the reduction ratio between the first surface and the second surface can be obtained.

Although the case of targeting a passenger car, a truck, and a bus has been described as an example, the present embodiment is not limited thereto. For example, if a feature can be expressed by a cube or a rectangular parallelepiped facing a vanishing point in a video of the in-vehicle camera, for example, a motorcycle or a bicycle can also be used. As similar to this, for example, when an in-vehicle camera is used, it is also possible to obtain dimensions of a building or a constructed object such as a road transformer built in parallel with a road. In a case of a target not on a road, for example, the present embodiment can also be used for applications such as calculating an optimal route by obtaining the entire length of cardboard in front while an automatic delivery robot is moving along a corridor of a building.

An example in which the installation orientation of the in-vehicle camera is assumed to be installed at the front of the observation vehicle and directed forward has been described, but the present embodiment is not limited thereto. For example, a rear camera installed on the rear and facing rearward may be used. As similar to this, in a case of a side camera, the dimension of the "width" of a feature such as a vehicle traveling around can be obtained using the same method.

The entire length of the target can be obtained by applying a method of determining a decision line, drawing a line horizontally from each intersection coordinate, and obtaining how many meters the line is ahead of the in-vehicle camera. The entire length can also be obtained from the difference in lateral width of the side surface. However, the appearance of the side surface varies depending on the distance between the camera and another vehicle in the lateral direction in the real space. Therefore, it is necessary to perform a process of estimating the traveling lane of each other vehicle from the obtained inclination or the like of the line segment connecting the detection rectangle (front or rear) and the vanishing point, acquiring the width information of each traveling lane from the map data or the like, and evaluating for each condition. In addition, dimensions other than the entire length of the vehicle can also be calculated. As a result, for example, the width and the height can be estimated. Thus, by utilizing the decision line calculation method, dimensions other than the entire length of the vehicle can also be calculated.

The decision line calculation unit 122 may calculate a plurality of decision lines. In this case, for example, if two decision lines having different distances from the distance D1 and the distance D2 are calculated, the decision formula corresponding to the distance to the decision line acquired from the storage unit 118 is different. The detection unit 114 is only required to detect a detection rectangle including the first surface in proximity for each of the plurality of decision lines.

Note that the dimension estimation processing executed by the CPU reading software (program) in the above embodiment may be executed by various processors except the CPU. Examples of the processors in this case include a programmable logic device (PLD) of which a circuit configuration can be changed after manufacturing, such as a field-programmable gate array (FPGA), and a dedicated electric circuit that is a processor having a circuit configuration exclusively designed for executing specific processing, such as an application specific integrated circuit (ASIC). The dimension estimation process may be executed by one of these various processors or may be executed by a combination of the same type or different types of two or more processors (for example, a plurality of FPGAs, a combination of a CPU and an FPGA, or the like). Further, a hardware structure of the various processors is, more specifically, an electric circuit in which circuit elements such as semiconductor elements are combined.

In the above embodiment, an aspect in which the dimension estimation program is stored (installed) in advance in the storage 14 has been described, but the embodiment is not limited thereto. The program may be provided in a form of a program stored in a non-transitory storage medium such as a compact disk read only memory (CD-ROM), a digital versatile disk read only memory (DVD-ROM), or a Universal Serial Bus (USB) memory. In addition, the program may be downloaded from an external device via a network.

With regard to the above embodiments, the following supplementary notes are further disclosed.

(Supplementary Note 1)

A dimension estimation device including:

memory; and at least one processor connected to the memory, in which the processor is configured to:

acquire an image acquired in a moving body;

calculate a vanishing point and a predetermined decision line in the image;

detect an object in the image and detects a detection rectangle that is a rectangle including a first surface that is a surface close to a photographing position, the first surface being in proximity to the decision line for the object; and estimate a dimension of the object on the basis of a ratio between a height of the first surface and a height of a second surface that is a surface far from the photographing position obtainable from a relationship between the detection rectangle and the vanishing point.

(Supplementary Note 2)

A non-transitory storage medium in which a program executable by a computer to execute dimension estimation processing, the dimension estimation processing including:

acquiring an image acquired in a moving body;

calculating a vanishing point and a predetermined decision line in the image;

detecting an object in the image and detecting a detection rectangle that is a rectangle including a first surface that is a surface close to a photographing position, the first surface being in proximity to the decision line for the object; and estimating a dimension of the object on the basis of a ratio between a height of the first surface and a height of a second surface that is a surface far from the photographing position obtainable from a relationship between the detection rectangle and the vanishing point.

The invention claimed is:

1. A dimension estimation device comprising:

a memory; and at least one processor coupled to the memory, the at least one processor being configured to:

acquire an image acquired in a moving body;

calculate a vanishing point and a predetermined decision line in the image;

detect an object in the image and detect a detection rectangle that is a rectangle including a first surface that is a surface close to a photographing position, the first surface being in proximity to the decision line for the object; and estimate a dimension of the object based on a ratio between a height of the first surface and a height of a second surface that is a surface far from the photographing position obtainable from a relationship between the detection rectangle and the vanishing point.

2. The dimension estimation device according to claim 1, wherein the processor is configured to calculate a line segment with respect to the first surface of the detection rectangle from the vanishing point, and calculate a height of the first surface as a side component of a circumscribed rectangular parallelepiped.

3. The dimension estimation device according to claim 1, wherein the processor is configured to, in the calculation of the decision line, calculate a photographable range based on a position and an angle of view of a camera obtained from camera information of a camera, and calculate the decision line by drawing a line at a position at a predetermined distance in a lower portion of the image.

4. The dimension estimation device according to claim 1, wherein the processor is configured to detect a side surface of the object and obtain a line segment connecting the side surface of the object on a side far from the vanishing point of the detection rectangle, and the vanishing point, and calculate the height of the first surface and the height of the second surface with respect to the side surface.

5. The dimension estimation device according to claim 1, wherein the processor is configured to calculate a plurality of decision lines, and detect the detection rectangle for each of the plurality of decision lines.

6. The dimension estimation device according to claim 1, wherein the processor is configured to estimate the dimension of the object by using a predetermined expression according to a distance to the decision line and the ratio of the heights.

7. A dimension estimation method comprising causing a computer to execute processing of:

acquiring an image acquired in a moving body;

calculating a vanishing point and a predetermined decision line in the image;

detecting an object in the image and detecting a detection rectangle that is a rectangle including a first surface that is a surface close to a photographing position, the first surface being in proximity to the decision line for the object; and estimating a dimension of the object based on a ratio between a height of the first surface and a height of a second surface that is a surface far from the photographing position obtainable from a relationship between the detection rectangle and the vanishing point.

8. A non-transitory, computer-readable storage medium storing a dimension estimation program that causes a computer to execute processing of:

acquiring an image acquired in a moving body;

calculating a vanishing point and a predetermined decision line in the image;

detecting an object in the image and detecting a detection rectangle that is a rectangle including a first surface that is a surface close to a photographing position, the first surface being in proximity to the decision line for the object; and estimating a dimension of the object based on a ratio between a height of the first surface and a height of a second surface that is a surface far from the photographing position obtainable from a relationship between the detection rectangle and the vanishing point.

* * * * *